Dec. 22, 1970  P. R. PLUTA  3,549,489
SYSTEM FOR DETECTING SODIUM BOILING IN A REACTOR
Filed Oct. 22, 1968  2 Sheets-Sheet 1

INVENTOR.
PHILIP R. PLUTA
BY
ATTORNEY

United States Patent Office 3,549,489
Patented Dec. 22, 1970

3,549,489
SYSTEM FOR DETECTING SODIUM BOILING IN A REACTOR
Philip R. Pluta, San Jose, Calif., assignor to the United States of America as represented by the United States Atomic Energy Commission
Filed Oct. 22, 1968, Ser. No. 769,655
Int. Cl. G21c 7/06
U.S. Cl. 176—22               5 Claims

ABSTRACT OF THE DISCLOSURE

A system for detecting and controlling sodium boiling in a sodium cooled nuclear reactor. Frequency analysis of the neutron flux signal from in-core or out-of-core detectors indicates the onset of incipient sodium boiling before there is any noticeable net power change which would otherwise require corrective action to be taken. Since incipient sodium boiling has a characteristic frequency associated with the collapse of the sodium bubbles, the collapse rate or boiling frequency of the bubbles is communicated to the flux noise as a coherent signal whose amplitude is determined by filtering means. This signal is then transmitted through appropriate electronics for actuating the control rod system of the reactor for controlling the reactivity thereof, thereby providing a reactor safeguard system.

BACKGROUND OF THE INVENTION

The invention described herein was made in the course of, or under, Subcontract No. W-31-109-38-1997 under Contract No. W-31-109-ENG-38 with the United States Atomic Energy Commission.

This invention relates to monitoring liquids for the onset of boiling, and particularly to monitoring liquid sodium coolant in a reactor.

For a known liquid subject to a given pressure condition, the temperature of the liquid can be measured for the purpose of establishing whether or not the boiling point has been reached. However, this procedure suffers from the disadvantages that the registration of a temperature change usually lags slightly behind the actual change, and the change so registered is specific only to those regions where the measurement is being taken. Thus, it is impossible by any temperature measuring technique to ascertain the temperature at every point in a large bulk of liquid if the distribution is not uniform. The situation may therefore arise that boiling commences at one point in the bulk while the temperature taken at other points is below the relevant boiling point.

Non-uniform temperature distribution occurs for example in liquid receiving heat from a nuclear reactor core, i.e., liquid contained for a time in the same vessel as the core. A particular case in point is a nuclear reactor which is cooled by a liquid metal, such as sodium; in this case there are narrow channels formed between the fuel elements for the flow of coolant through the core. If in operation of the reactor, the flow through such a channel becomes seriously obstructed, as by the lodging therein of solid matter entrained with the coolant, the adjacent fuel may be insufficiently cooled and tend to overheat. In turn, this may lead to fuel melting and the consequences related thereto.

Therefore, one of the problems of the prior art has been to provide a temperature monitoring means, whereby the temperature of the bulk of the liquid can be continuously monitored so that the reactor can be properly controlled to compensate for undesirable temperature conditions.

Prior efforts have been directed to various means for providing effective temperature monitoring of the reactor coolants, as exemplified by U.S. Pat. 3,240,674 issued to T. J. Ledwidge which utilizes a monitoring means for a spectrum of detectable sonic waves which are generated by the formation of bubbles to detect the small bubbles formed in the phase known as "nucleate boiling" which occurs as a preliminary to bulk boiling.

SUMMARY OF THE INVENTION

The frequency characteristic of liquid metal boiling, the propagation of reactivity transfer function and the sensitivity requirements of a detection system are combined in this invention to incorporate the detection of sodium boiling and corrective action required as a result of the boiling to provide a unique safeguard system for a liquid metal fast breeder reactor. This is accomplished by showing the onset of slow incipient sodium boiling by frequency analysis of the neutron flux signal from in-core detectors, since incipient boiling has a characteristic frequency associated with the collapse of the sodium bubbles, thus providing a more effective and reliable system than that of the prior art.

Therefore, it is an object of this invention to provide a means for detecting boiling of a liquid within a nuclear reactor.

A further object of the invention is to provide a system for detecting reactor coolant boiling and initiating corrective action, thereby providing a safeguard system.

Another object of the invention is to provide a means for detecting incipient sodium boiling and initiating corrective action prior to actual boiling of the sodium.

Another object of the invention is to provide a means for detecting and controlling sodium boiling in a sodium cooled reactor by frequency analysis of the neutron flux signal for in-core detectors based upon a characteristic frequency associated with the collapse of the sodium bubbles.

Other objects of the invention will become readily apparent from the following description and accompanying drawings wherein:

DESCRIPTION OF THE INVENTION

Figure 2:
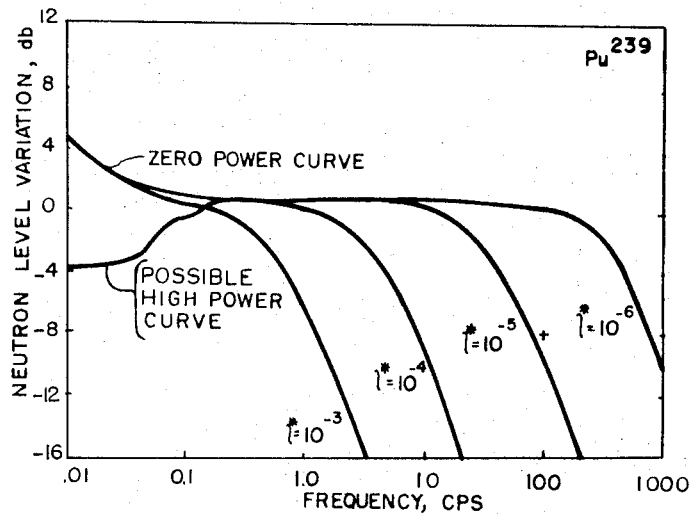
FIG. 2 is a graph showing the transfer function amplitude response, utilizing plutonium-239, as a function of prompt neutron lifetime 1*.

While the following description is directed to liquid sodium or an alloy thereof with potassium, it is not intended to limit the invention to the specific materials described.

Prior to discussing the theory, supporting investigations, and embodiment of the inventive system, it is pointed out that the invention concerns a system for controlling sodium boiling in a sodium-cooled reactor, and comprises basically, a means for measuring neutron flux density located in or neutrons emitted from said reactor, means for detecting cyclic variations in neutron flux density connected to said means for measuring neutron flux density, means for detecting a characteristic frequency of sodium boiling and providing an output signal when a said frequency is detected and being connected to said means for detecting cyclic variations in neutron flux density, and means connected to the output of said means for detecting a characteristic frequency for decreasing the reactivity of said reactor when sodium boiling is detected and increasing the reactivity of said reactor when no sodium boiling is detected. Thus, the invention provides a safety device for a sodium-cooled reactor to detect and prevent dangerous voiding of the sodium and resulting dangerous increases in reactivity.

Engineering safeguards and design techniques which minimize the possibility or consequences of sodium boiling are required to realize the economic incentives possible with the advanced sodium-cooled fast reactor. Frequency analysis of the neutron flux signal from in-core detectors will show the onset of slow incipient sodium boiling before there is any noticeable net power change which would otherwise require corrective action to be taken.

Sodium boiling has a characteristic frequency distribution associated with the collapse of the sodium bubbles. The use of this reactivity signal as the basis of a portion of a safeguard detection system of an advanced liquid metal fast breeder reactor (LMFBR) has been investigated and found that:

(1) The frequency of the characteristic signal occurs within the frequency band spectrum where the reactor transfer function has good gain characteristics (zero db) and the reactivity-flux power-spectral-density driving function is otherwise essentially white noise (white noise implying a constant random noise spectrum over the band of frequencies being considered).

(2) The utilization of the hereinafter described detection technique is dependent upon a detection-filtering arrangement that can monitor amplitude variations of between 0.01–0.1% in the core power (flux).

It is desirable to detect incipient sodium boiling in an LMFBR and take the appropriate corrective action to control the reactor. Incipient boiling is defined herein as a condition of boiling wherein less than 50% of the subassembly coolant is in the gas phase. In the past, the normal approach to detect boiling has been to measure the change in the overall or local power (flux) level resulting from the positive sodium void coefficient. However, it now has been found possible to detect boiling earlier by taking advantage of the random nucleation and collapse of sodium bubbles associated with incipient boiling. These bubbles have a characteristic collapse rate or frequency that is related to the surface tension of sodium, etc. The boiling frequency is communicated to the flux noise as a coherent signal, and its amplitude is picked out using conventional filtering techniques.

The frequency theory upon which the detection portion of this invention is based has proven useful as a means of detecting incipient boiling the Saxton PWR (power water reactor), as described in an article entitled "Reactor Noise Measurements on Saxton Reactor" by V. Rajagopal and published in TID 7679, AEC Symposium Series #4, 1964. The Saxton reactor is a small closed-cycle pressurized-light-water reactor. In the small Saxton core both in-core and out-of-core flux detectors were used successfully. Although the Saxton reactor utilized an elaborate filtering scheme, it has now been found that a simple redundant bandpass filter tied into the reactor control system, using an amplitude trip response, is adequate. Basically, the Saxton experience showed that this was a suitable technique to detect incipient boiling in a pressurized water reactor.

Figure 1:
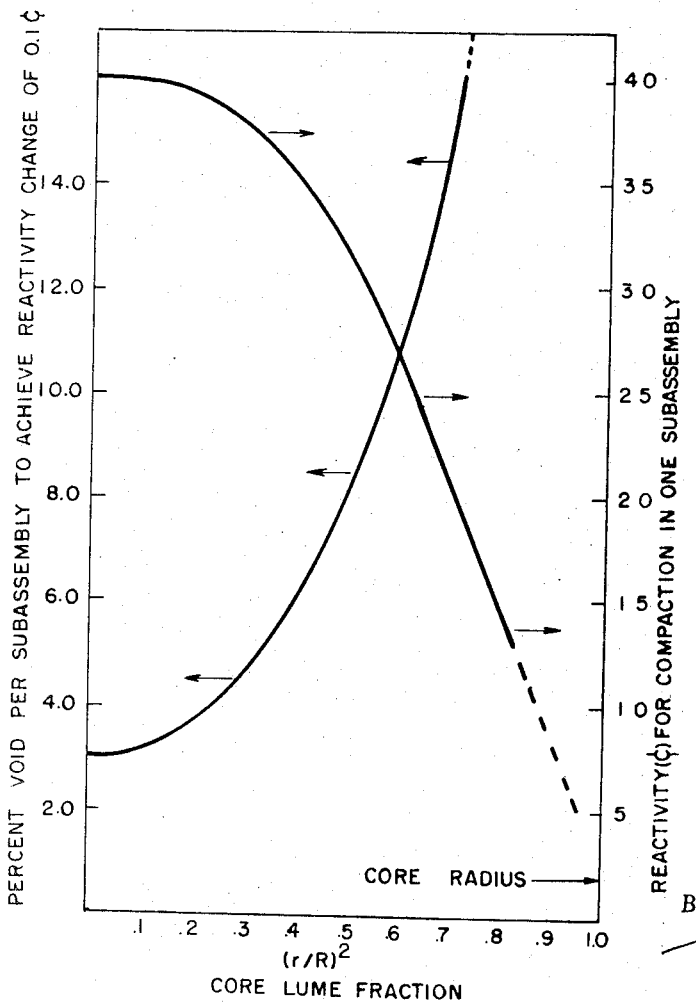
FIG. 1 is a graph showing approximate sodium void worths and fuel compaction worths for an exemplary subassembly.

A representative estimate of the sodium void fraction in one subassembly of a representative LMFBR, as a function of radial position, required to achieve a reactivity effect of 0.1¢ is given in FIG. 1, showing the expected decreased neutron importance in the peripheral direction. The void reactivity was estimated from one-dimensional diffusion theory calculations in which a thin annular ring of sodium was removed from the core. The approximate relative fuel compaction subassembly worth is also shown in FIG. 1, based on a power squared weighting technique.

Voiding calculations were incomplete in the outer core regions. However, it can be assumed that near the core-radial blanket interface large scale voiding would result in only small changes in reactivity. (It is also likely that a zero or negative sodium void reactivity effect may occur in the subassemblies of this outer core region.) It is apparent that the present inventive detection system is not applicable in the outer region because of the large void fractions required or the small reactivity effect. However, the significant decrease in the relative fuel redistribution worth in the outer core region does indicate that the propagation of flow blockage, voiding and compaction will proceed slowly, if at all. Thus, other backup devices, such as thermocouples or flow instrumentation and power level monitors can satisfy the safeguards requirements, associated with boiling in the peripheral fuel subassemblies.

FIG. 1 shows that bundle void fractions greater than 3% are required to produce a change in reactivity of 0.1¢. However, it should be noted that the collapse of the sodium bubbles will result in an oscillating void effect around a mean void fraction, and the resultant swing in reactivity will in general be less than 0.1¢.

Inspection of the point kinetics equations solution for a step reactivity insertion shows that $$\left(\frac{\text{percent power change}}{\text{initial power}}\right)/\text{¢ step reactivity}=1$$

as long as the delayed neutron effects are unimportant (frequencies $\geqslant 0.1$ c.p.s.) and prompt neutron effects do not dominate. Thus, the detection of incipient sodium voiding with reactivity oscillation of less than 0.1¢ will require a monitoring technique capable of detecting a variation of less than 0.1% in the core power (flux). It is thus reasonable that flux detection-filtering-techniques can identify signals on this order or less.

In the characteristic frequency of sodium boiling, the flux power spectral density function, $\phi_{yy}(\omega)$, is related to the flux-reactivity driving spectrum, $\phi_{xx}(\omega)$ by:

$$\phi_{yy}(\omega)=|Y(i\omega)|^2\phi_{xx}(\omega)$$

where $Y(i\omega)$ is the usual reactor transfer function, and $\omega$ is the angular frequency.

Interest of this inventive concept is in both terms on the r.h.s. of the above equation as they are related to the generation of a sodium boiling signal and the transmission of the reactivity effect to the detection system.

The zero power transfer function of a plutonium fueled reactor is given in FIG. 2 for several neutron lifetimes. The relationship between the zero power transfer function and the operating (at power) transfer function are both indicated in FIG. 2. The two functions are dissimilar only at frequencies below ~1 c.p.s.

The upper break point of the transfer function curves, where the reactor response starts to fall off with frequency, is given by the ratio of the delay neutron fraction, $\beta$, and the prompt neutron lifetime, 1*. For a representative LMFBR, $\beta$ and 1* are approximately 0.0035 and 0.5 microseconds, respectively. The resultant break point frequency is on the order of 1100 c.p.s. The transfer function amplitude response is "flat" between 1 and 1000 c.p.s.

The reactivity driving function, $\phi_{xx}(\omega)$, is dependent upon a number of sources of reactivity variations, only one of which would be sodium boiling.

Figure 3:
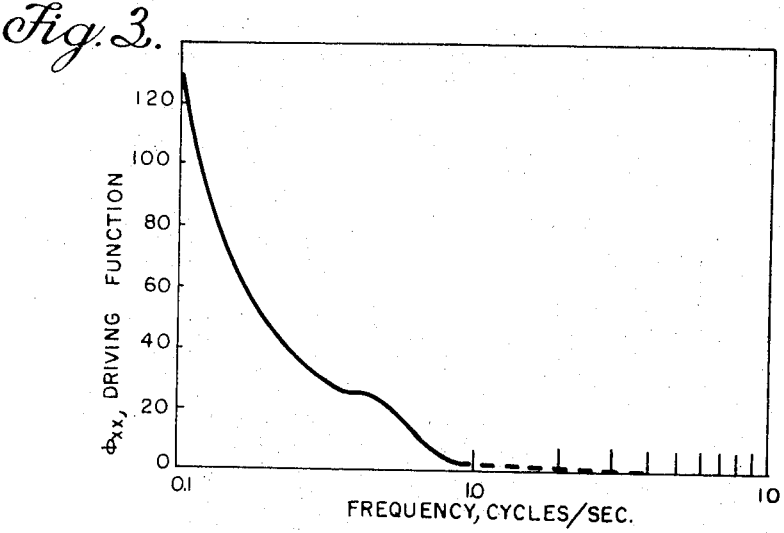
FIG. 3 is a graph showing the driving-power-spectral-density function as a function of frequency.

These reactivity sources, for example, can be a varying sodium flow rate or sodium inlet temperature, etc. An analytical prediction of these effects is difficult for a sodium-cooled reactor concept (or any other type of power reactor). However, on the basis of observations of boiling water reactors, a good preliminary indication of the reactivity driving function can be made. FIG. 3 indicates the shape of the reactivity driving function, $\phi_{xx}(\omega)$, for an LMFBR (similar to a BWR) as a function of frequency. The driving function is primarily a low frequency input. Above 1 c.p.s. the amplitude signal is "flat."

In the frequency range from 1 to 1000 c.p.s. the transfer function has a good gain (zero db) and $\phi_{xx}(\omega)$ is essentially white noise (the constant random noise spectrum over this band of frequencies). This is an ideal situation for the present purpose of detecting sodium voiding, since it is now believed boiling occurs in this frequency range.

Therefore, since the characteristic sodium bubble collapse frequency is expected to fall within the reactor frequency band 1–1000 c.p.s., all the conditions are right for detecting sodium boiling by the flux detector and filtering arrangement described hereinafter. Cross correlation techniques can be expected to appreciably lower the minimum $S/N$ ratio can be detected.

Figure 4:
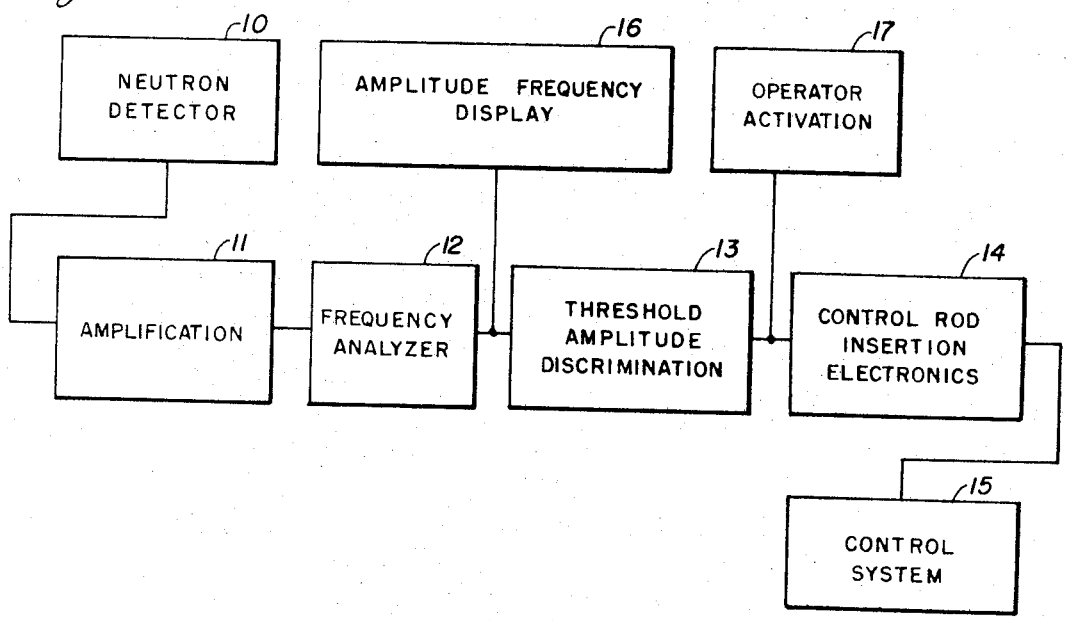
FIG. 4 is a block diagram illustrating the inventive system which incorporates sodium boiling detection into a reactor control and safety system.

FIG. 4 shows a representative block diagram for detecting sodium boiling and taking corrective action by the control rod system in accordance with the invention as theoretically discussed above. A neutron detector 10 is located in the reactor core or blanket region or further removed from the core if the flux sensitivity requirements of this safeguards system are met (not shown); the signal output of which is amplified at 11 and sent to a frequency analyzer 12. The detector 10 may be a fission detector or one based on the Campbell theorum as commonly known in the art. Any type of neutron detector may be satisfactory depending on its satisfactory operation, sensitivity and efficiency in the hostile environment in and near a nuclear reactor core. Also combinations of neutron detectors positioned in various places in the core or blanket or out-of-core and connected to a common output or to separate outputs may be utilized. The signal from detector 10 is amplified at 11 so that it can be analyzed, observed, recorded and used to actuate other electronic circuits. For a given system a number of separate stages of amplification are normally required at a number of points. The need for auxiliary treatment of the electrical signal from the neutron detector 10 is well understood and conventional, depending on the particular nuclear installation and hardware components used in the remainder of the circuit to accomplish the desired goal of detecting sodium boiling and taking corrective action in view thereof.

The fluctuations in the neutron level are transmitted to the frequency analyzer 12 as a time varying electrical signal and analyzed in the frequency domain using a short time constant electronic "filter." The electronic filter can take a number of different forms—all of which may be satisfactory depending on the design philosophy used to set up a particular sodium boiling detection system. For example, the analyzer 12 may be: (1) a simple band-pass filter, (2) a power spectral density function analyzer, and (3) a cross power spectral density function analyzer. Specific models of equipment that are available to do similar frequency analysis are discussed in the inventor's article: "Preliminary Results of Vallecitos Boiling Water Reactor Noise Analysis," AEC Symposium, Series No. 4, TID–7679, June 1964, and in other papers given at that symposium. Frequency analysis techniques are widely understood and utilized by many disciplines, including applications for nuclear neutron flux variation analysis.

The output signal from frequency analyzer 12 is passed into a threshold amplitude discriminator 13 whose output is directed to control rod insertion electronics 14 which activate the control system 15. When the amplitude of the sodium boiling related neutron signal, over the frequency range characteristic of sodium boiling or for a specific base frequency in the reactor plant for which this invention is specifically designed, exceeds a preset level, corrective action for controlling the reactor is required to lessen the consequences of this sodium boiling. When the amplitude of the signal is less than the preset threshold, no corrective action by the control rod system is required since there is no significant sodium boiling taking place. When the threshold amplitude is exceeded in discriminator 13, the electronics 14 are activated which result in the insertion of one or more control rods of system 15. The circuitry of the discriminator 13 and the insertion electronics 14 as well as the mechanism of system 15 is conventional and need not be described in detail herein.

If desired, an amplitude vs. frequency display 16 may be incorporated intermediate between the frequency analyzer 12 and threshold amplitude discriminator 13 for providing a continuous on-line display of the sodium boiling frequency dependent signal or integrated signal over the frequency band of interest for the control room operators. To provide an operator with the ability to manually initiate control rod insertion based on visual observation of the display 16 or on hearing display related alarms when the set point is exceeded, an operator activator 17 is incorporated between discriminator 13 and the control rod insertion electronics 14. Thus, there is nothing in the present inventive system which will compromise the basic reliability and integrity of the normal reactor detection, control and/or safeguards system.

It has thus been shown that the present invention provides a system for detecting incipient sodium boiling by the characteristic frequency associated therewith, and utilizes this signal for controlling the reactor.

The invention as described and illustrated has many variants. Single in-core or out-of-core neutron flux detectors can be used, as well as two or more in-core or out-of-core detectors or any combination of in-core and out-of-core neutron flux detectors. The neutron flux noise data can be analyzed as an auto or cross correlation function (in the time domain), or as auto or cross power spectral density functions (in the frequency domain). There are many ways in which the interpreted neutron flux noise signal can be related to the reactor control system to effectuate corrective action after obtaining a decisive signal that sodium boiling is occurring. For example, the control rods could be run in or scrammed; annunciators could be sounded; power could be reduced; etc. or any combination of these. Any desired degree of redundancy could be achieved in the neutron flux detection-noise evaluation-safeguards-control equipment and procedures.

While particular embodiments of the invention have been illustrated and/or described, modifications will become apparent to those skilled in the art, and it is intended to cover in the appended claims all such modifications as come within the true spirit and scope of the invention.

I claim:

1. A system for detecting boiling of liquid metal coolant in a nuclear reactor and for controlling such boiling comprising: means located in a reactor for measuring neutron flux density, means connected to said measuring means for detecting cyclic variations in neutron flux density, means connected to said cyclic variation detecting means for detecting a characteristic frequency of boiling liquid metal and providing an output signal when such a frequency is detected, and means connected to the output said frequency detecting means for decreasing the reactivity of said reactor when liquid metal boiling is detected and for increasing the reactivity of said reactor when no liquid metal boiling is detected.

2. The system defined in claim 1, wherein said last mentioned means includes a control system for said reactor, and electronic means for activating said control system.

3. The system defined in claim 1, additionally including an amplitude versus frequency display connected intermediate said frequency detecting means and said last mentioned means.

4. The system defined in claim 1, additionally including means for manually controlling the reactivity of said reactor connected to said last mentioned means.

5. The system defined in claim 1, wherein said measuring means comprises at least one neutron detector; said cyclic variation detecting means comprising an amplification means; said frequency detecting means comprising a frequency analyzer; and said last mentioned means including a threshold amplitude discriminator.

References Cited

UNITED STATES PATENTS 3,240,674 3/1966 Ledwidge _____ 176—19

3,264,863 8/1966 Maropis _____ 176—19X

CARL D. QUARFORTH, Primary Examiner

H. E. BEHREND, Assistant Examiner

U.S. Cl. X.R.

176—19